(12) United States Patent
Matsukawa et al.

(10) Patent No.: US 8,099,461 B2
(45) Date of Patent: Jan. 17, 2012

(54) CONFERENCE SYSTEM AND ITS MULTIMEDIA DATA STORAGE METHOD

(75) Inventors: Fumikazu Matsukawa, Ome (JP); Shigeru Fukazawa, Hachioji (JP); Yasumasa Sasaki, Tachikawa (JP); Koji Shima, Sagamihara (JP); Nobuyuki Takeda, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1085 days.

(21) Appl. No.: 11/945,661

(22) Filed: Nov. 27, 2007

(65) Prior Publication Data

US 2008/0123565 A1    May 29, 2008

(30) Foreign Application Priority Data

Nov. 28, 2006    (JP) .................................. 2006-320376

(51) Int. Cl.
*G06F 15/16* (2006.01)
(52) U.S. Cl. .......................... 709/204; 709/217
(58) Field of Classification Search .................. 709/204, 709/205, 207, 213, 217–219, 223, 231, 238, 709/239
See application file for complete search history.

(56) References Cited

U.S. PATENT DOCUMENTS

| 6,208,372 | B1* | 3/2001 | Barraclough | 348/14.16 |
|---|---|---|---|---|
| 6,587,870 | B2* | 7/2003 | Takagi et al. | 709/204 |
| 7,325,073 | B2* | 1/2008 | Shao et al. | 709/238 |
| 7,404,001 | B2* | 7/2008 | Campbell et al. | 709/231 |
| 7,415,527 | B2* | 8/2008 | Varadarajan et al. | 709/231 |
| 7,483,523 | B2* | 1/2009 | Abou-chakra et al. | 379/90.01 |
| 7,640,301 | B2* | 12/2009 | Walter | 709/204 |
| 7,715,872 | B2* | 5/2010 | Kim et al. | 455/553.1 |
| 7,773,581 | B2* | 8/2010 | Punj et al. | 370/352 |
| 2001/0041586 | A1* | 11/2001 | Irube et al. | 455/556 |
| 2006/0050685 | A1* | 3/2006 | Sung et al. | 370/352 |
| 2006/0184624 | A1* | 8/2006 | Thukral | 709/204 |
| 2009/0141118 | A1* | 6/2009 | Chun | 348/14.07 |

FOREIGN PATENT DOCUMENTS

| JP | 2000-115738 | 4/2000 |
|---|---|---|
| JP | 2002-199377 | 7/2002 |
| JP | 2005-311670 | 11/2005 |

* cited by examiner

*Primary Examiner* — Faruk Hamza
(74) *Attorney, Agent, or Firm* — Pillsbury Winthrop Shaw Pittman, LLP

(57) ABSTRACT

According to one embodiment, a conference system which is provided with a plurality of communication terminals, a communication network connecting the plurality of communication terminals thereto and forming a communication environment, and a server apparatus actualizing a conference among users by using the communication network, wherein each of the communication terminals includes a notice processor notifying an acquisition request including the fact of a request to acquire multimedia data and identification information to the server apparatus, and a storage unit storing the multimedia data, and the server apparatus includes a memory unit associating a communication terminal that is a request origin with the identification information, and storing them, an inquiry processor inquiring a possibility to become the route of the multimedia data, and a transmission processor transmitting the multimedia data to the communication terminal of the request origin via the communication terminal of the route.

8 Claims, 5 Drawing Sheets

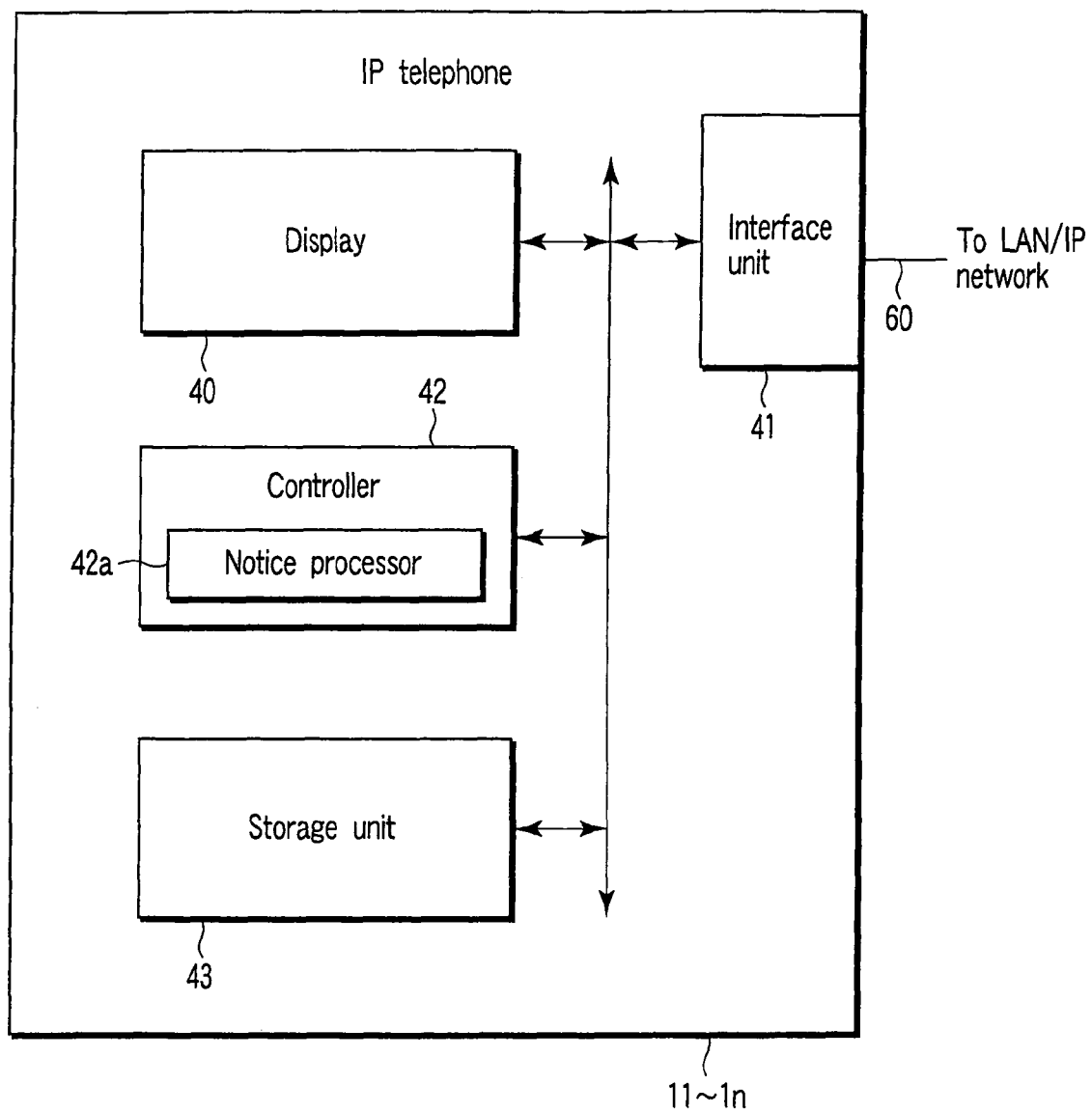
F I G. 2

US 8,099,461 B2

CONFERENCE SYSTEM AND ITS MULTIMEDIA DATA STORAGE METHOD

CROSS-REFERENCE TO RELATED APPLICATIONS

This application is based upon and claims the benefit of priority from Japanese Patent Application No. 2006-320376, filed Nov. 28, 2006, the entire contents of which are incorporated herein by reference.

BACKGROUND

1. Field

One embodiment of the invention relates to a conference system which is actualized as one application of a telephone system to be formed by using, for example, an Internet Protocol (IP) technique and its multimedia data storage method.

2. Description of the Related Art

A system which actualizes a voice communication via a best-effort type communication network such as the Internet is well known. The system of this kind is referred to as an IP telephone system or Voice over IP (VoIP), and is applied not only to a wide-area telephone network but also to a local communication network such as a private telephone network. Hereinafter, a telephone terminal in the system of this kind is referred to as an IP telephone including a fixed telephone and a software-implemented telephone (softphone). In recent years, a conference system also called a visual communication system (VCS) by using the system of this kind has become widely used (for example, refer to Jpn. Pat. Appln. KOKAI Publication No. 2000-115738).

By the way, in the existing technique, the conference system records video data and voice data of a video conference to a dedicated server by a terminal operation performed by a user who is actually participating in a conference. A user who wants to refer these items of the data obtains the data in a manner to receive steam distribution of the data or to download the data from the server.

The existing technique has to be provided with a server to store the data showing progress of the conference. If it is assumed that such a function is provided for the existing server, it is not preferable for the existing server because its original server function might be impaired by the provided function because the server consumes a large amount of resources. A user who wants to browse or listen multimedia data (including video and voice) has to access the server; it takes a long time for the access and sometimes, depending on the line conditions, irritates the user.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit scope of the invention.

FIG. 2 is a preferred functional block diagram illustrating IP telephones 11-1n of FIG. 1;

DETAILED DESCRIPTION

Various embodiments according to the invention will be described hereinafter with reference to the accompanying drawings. In general, according to one embodiment of the invention, a conference system which is provided with a plurality of communication terminals, a communication network which connects the plurality of communication terminals thereto and forms a communication environment among the communication terminals, and a server apparatus which actualizes a conference among users of the plurality of communication terminals by using the communication network, wherein each of the communication terminals comprises: a notice processor which notifies an acquisition request including the fact of a request to acquire multimedia data regarding the conference and identification information of a communication terminal to be a route of the multimedia data to the server apparatus before starting the conference; and a storage unit which stores the multimedia data to be transmitted via the communication terminal of the route, and the server apparatus comprises: a memory unit which associates a communication terminal that is a request origin with the identification information, and stores them when the acquisition request is notified; an inquiry processor which inquires a possibility to become the route of the multimedia data to the communication terminal of the route; and a transmission processor which transmits the multimedia data to the communication terminal of the request origin via the communication terminal of the route when a permission response is received from the communication terminal of the route in response to the inquiry.

Figure 1:
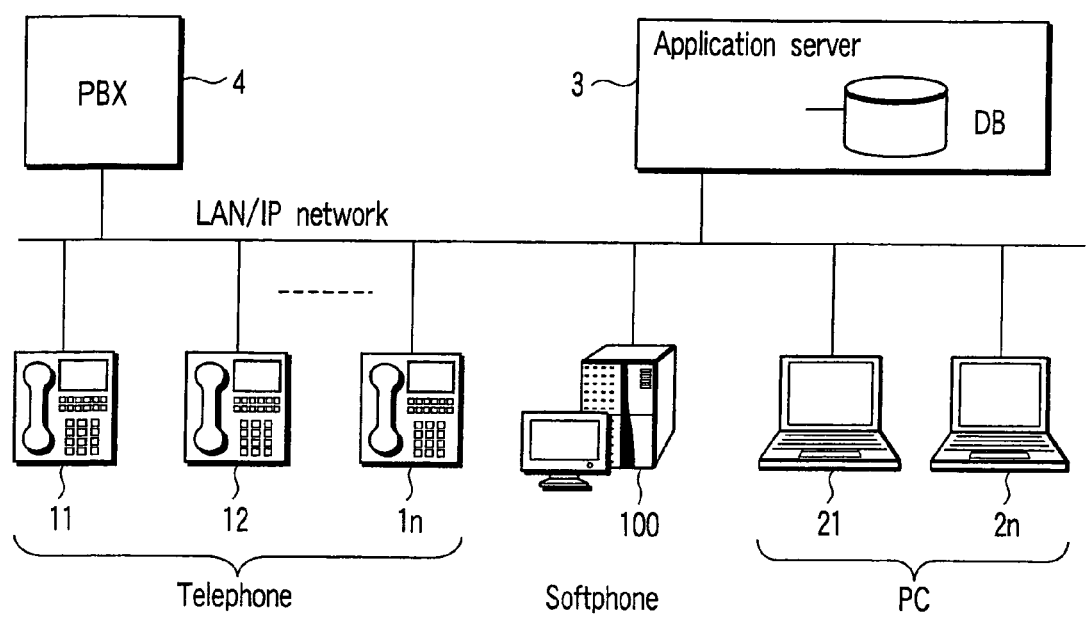
FIG. 1 is a preferred system view illustrating a conference system regarding the invention.

According to an embodiment, FIG. 1 shows a system view of a conference system regarding the present invention. In the system, a plurality of IP telephones 11-1n, a plurality of personal computer (PC) terminals 21-2n, a software-implemented PC telephone (softphone) terminal 100, an application server 3 and a private branch exchange (PBX) 4 are connected with one another via a LAN/IP network. The application server 3 implements call connection processing in response to a call connection request of inter-IP telephone 11-1n, or call connection processing in response to a call connection request from an outside line telephone from a public network (not shown). The PBX 4 implements call control regarding the softphone terminal 100 and the IP telephones 11-1n (generically referred to as IP terminals) through a cooperative operation with the application server 3. The softphone is a computer with software for the voice communication processing installed therein.

The system of FIG. 1 especially uses a Session Initiation Protocol (SIP) to conduct a variety of types of control related to the voice communication. When each IP terminal operates, the system uses the SIP to register each IP address and telephone number of each IP terminal. The application server 3 associates between the IP address and the telephone number of each IP telephone to manage them through a database DB. Further, each of the IP telephones 11-1n is associated with each of the PC terminals 21-2n one-to-one, respectively, by using the known technique.

FIG. 2 shows a functional block diagram showing the IP telephones 11-1n in FIG. 1. Each of the IP telephones 11-1n includes an interface unit 41 to be connected to the LAN/IP network through a LAN cable 60, a display 40, a controller 42 and a storage unit 43. Among them, the display 40 is a liquid crystal display (LCD), and displays a variety of messages visually. The storage unit 43 is a hard disk or a largecapacity semiconductor memory etc., and is used to store multimedia data such as video and voice data related to the conference.

The controller 42 includes a notice processor 42a. When the user of the IP telephone requires the storage of video data of the conference because the user becomes impossible to participate in the conference, the notice processor 42a notifies an acquisition request to the application server 3 in response to an operation showing the fact of the requirement. The acquisition request includes the fact of the requirement to acquire the video and voice data of the conference and identification information of the IP terminal to be a route of the video data of the conference.

Figure 3:
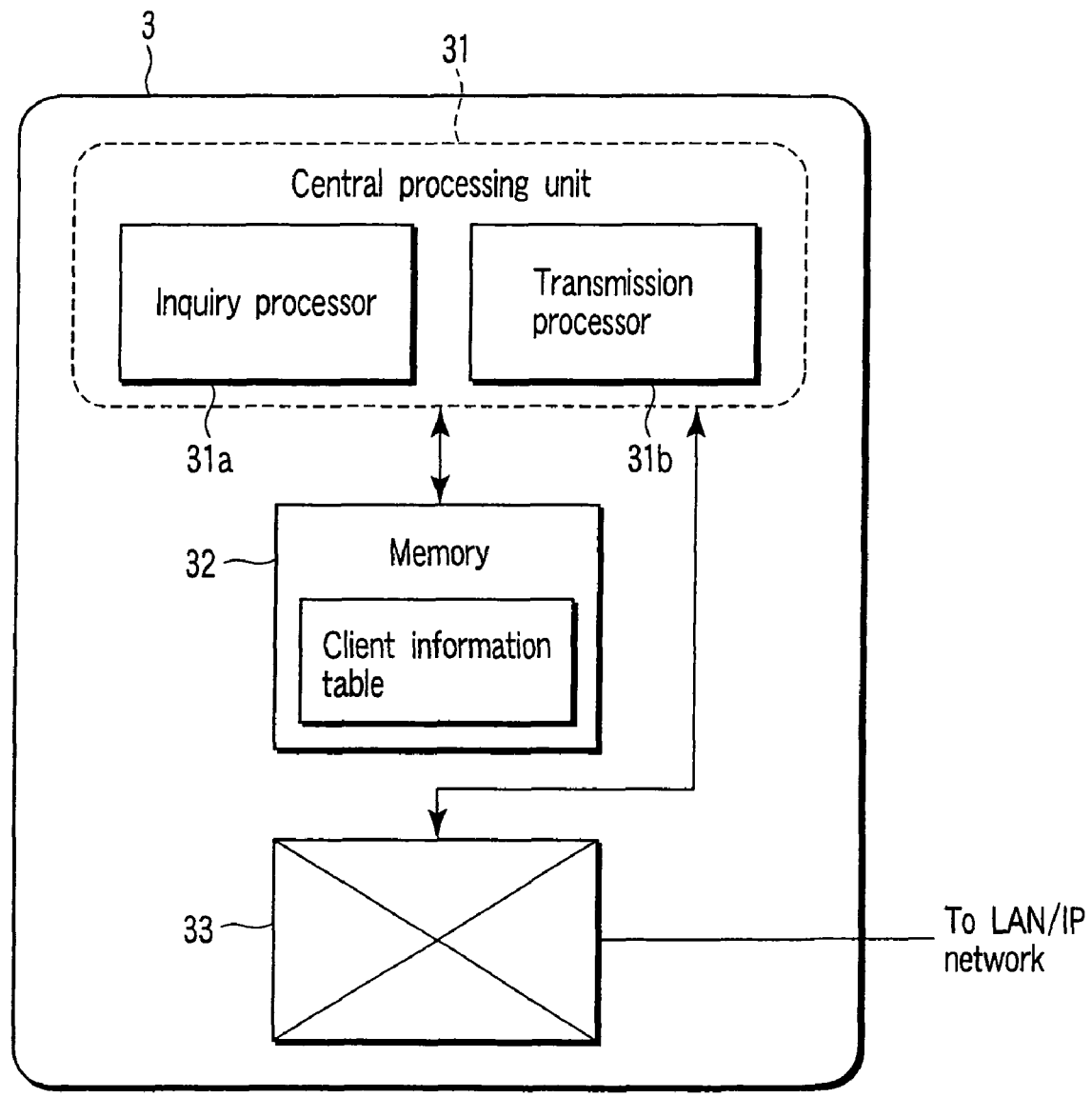
FIG. 3 is a preferred functional block diagram illustrating an application server 3 of FIG. 1.

FIG. 3 shows a functional block view showing the application server 3 of FIG. 1. The application server 3 is provided with a central processing unit 31, a memory 32 and an exchanging processor 33. The exchanging processor 33 is connected to the LAN/IP network to conduct a variety of kinds of call termination processing (group call termination, transfer, etc.) under the control by the processing unit 31. The memory 32 stores a client information table. The client information table is a table in which the IP terminal of a request origin and identification information (ID information, IP address, etc.) of the IP terminal on the route are associated with each other.

The processing unit 31 includes an inquiry processor 31a and a transmission processor 31b as a processing function regarding the embodiment. The inquiry processor 31a inquires a possibility to be the route of the video data of the conference to the IP terminal on the route specified by the identification information included in the acquisition request before the start of data communication in the conference. When receiving a permission response from the IP terminal on the route in response to the inquiry, the transmission processor 31b transmits the video data of the conference to the IP terminal of the request origin via the IP terminal. Next, operations in the given configuration will be described with reference to FIG. 4 and FIG. 5.

Figure 4:
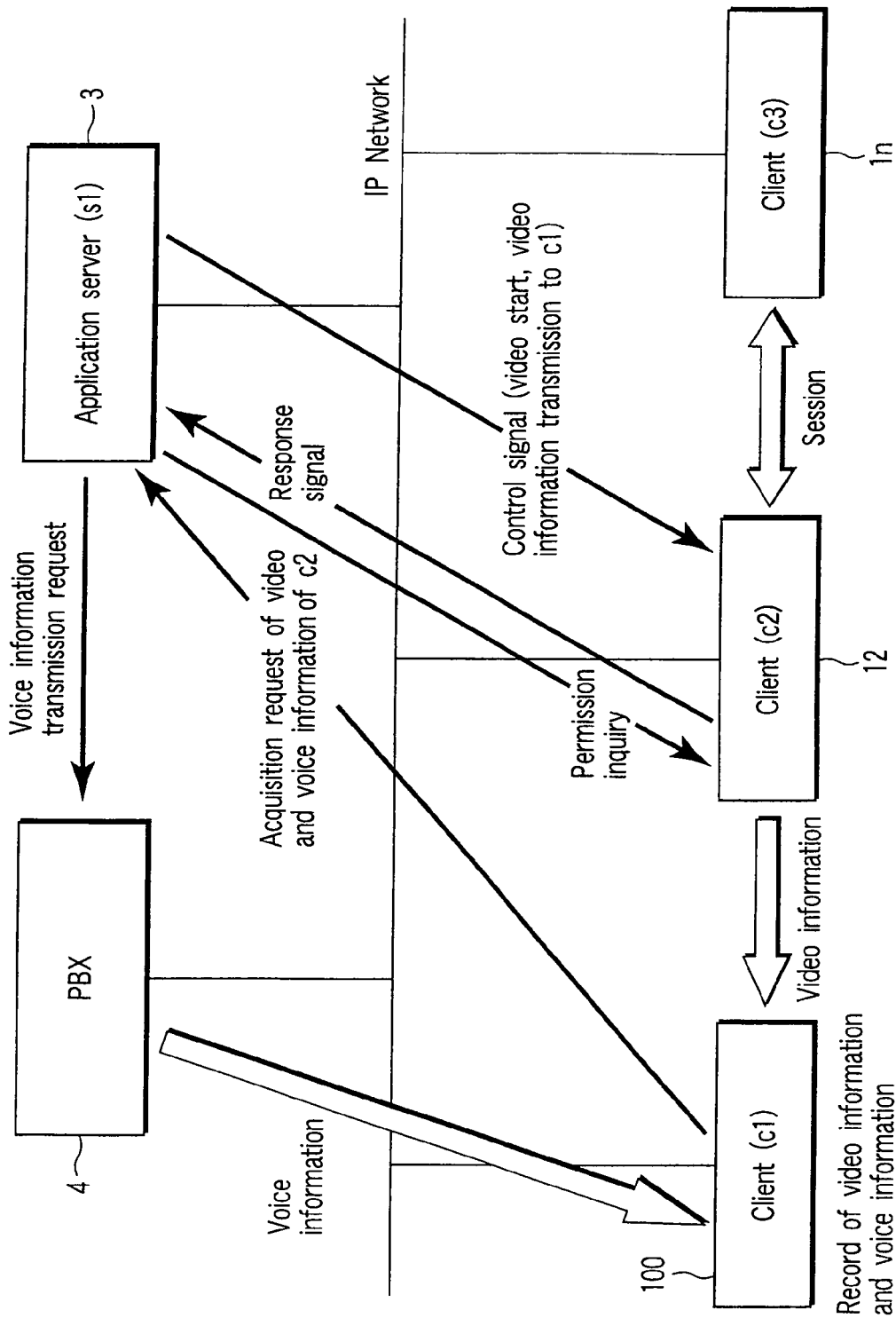
FIG. 4 is a preferred schematic view illustrating a sequence in storing multimedia data in the system of FIG. 1.
Figure 5:
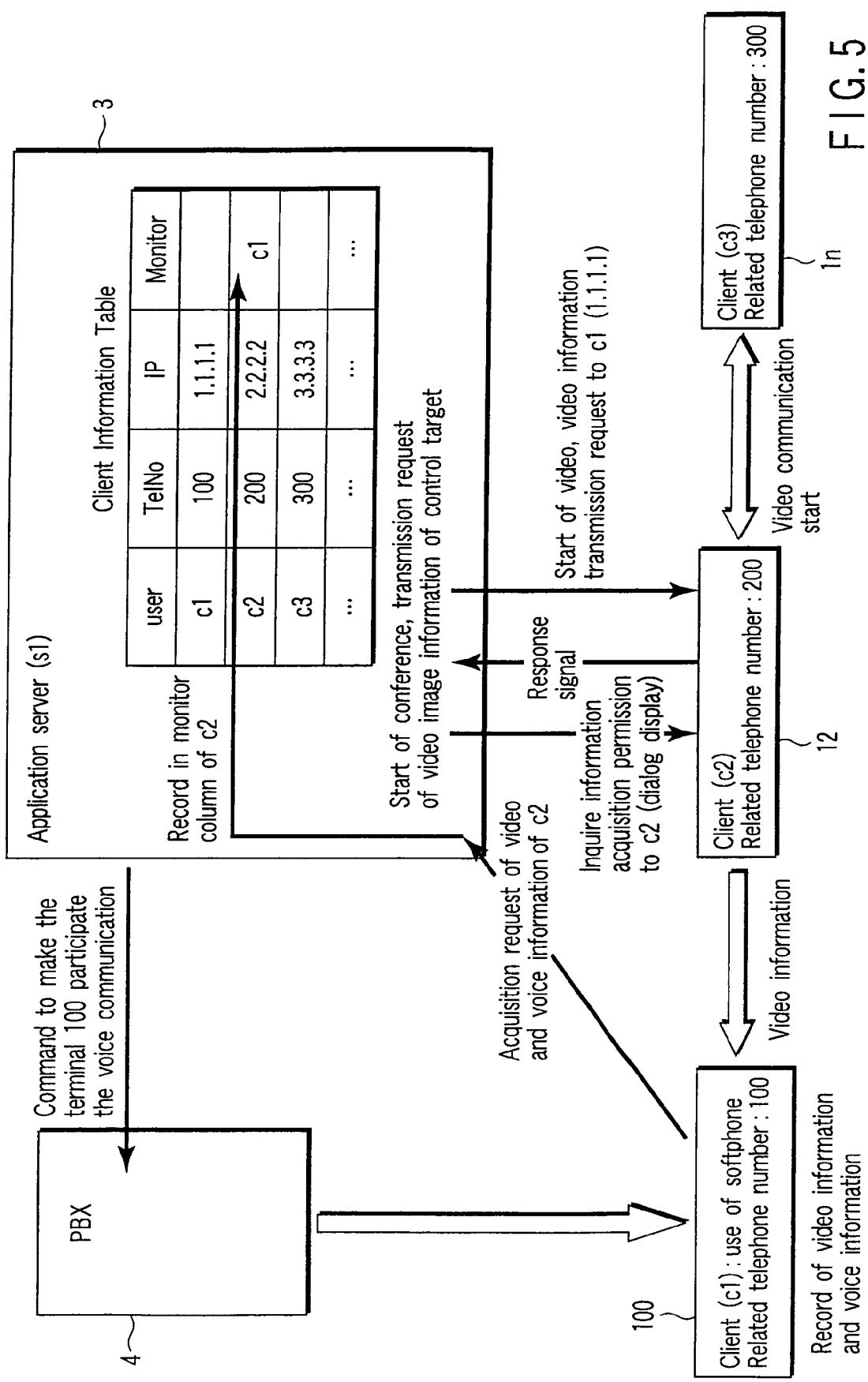
FIG. 5 is a preferred schematic view illustrating a flow of data in a sequence of FIG. 4

FIG. 4 shows a schematic view showing a sequence in storing multimedia data in the system of FIG. 1. FIG. 5 shows a schematic view showing flows of the sequence of FIG. 4. In both FIG. 4 and FIG. 5, the IP terminal is called a client and the application server is called a server s1. A client c1 corresponds to the softphone terminal 100, a client c2 corresponds to the IP telephone 12 and a client c3 corresponds to the IP telephone 1n.

Now, the client c1 intends not to participate in a scheduled video conference, but it wants to acquire the video and voice data of the conference. Since the client c1 becomes impossible to participate in the conference, through it has been scheduled to participate therein, it wants to acquire the video and voice data of the conference. In such a case, the client c1 transmits the acquisition request to the server s1 in advance. Here, it is assumed that an acquisition request, specifying the client c2 that is one of conference members as the route, is notified.

The server s1 which has received the acquisition request records the user name of the client c1 that is the request origin in a monitor column corresponding to the client c2 in a client information table in FIG. 5. Thereby, the fact of the acquisition request for the data from the client c1 is recorded.

When a video conference between the client c2 and the client c3 starts and the system completes preparation of a video communication, the server s1 refers to the client information table in order to control the video communication. In FIG. 5, the clients to be controlled include the client c2 which will receive an acquisition request from another client. Therefore, the server s1 firstly inquires a possibility of the information acquisition to the client c2 before transmitting a video communication start signal showing the fact of the start of the video communication. Here, the possibility of the information acquisition is transmitted by putting it on an SIP message (INVITE, NOTIFY, etc.).

The display 40 of the client c2 who has been inquired displays a dialog to select permission or rejection. The client c2 selects either the permission or the rejection. Thereby, a response signal is returned to the server s1. If the response signal indicates the rejection, the server s1 transmits the video communication start signal to the client c2. If the response signal indicates the permission, the server s1 transmits the video communication start signal including a transmission request (transmission destination is IP address of client c1) of the video data to the client c2.

The client c2 who has received the video communication start signal from the server s1 starts a video communication with the client c3. Here, if the video communication start signal has included the transmission request, the client c2 transmits the video data of the started video communication to the client c1 that is the request origin.

Further, the server s1 utilizes a third party call control function owned by the PBX 4 which manages voice data on a telephone call and makes the softphone terminal 100 of the client c1 participate the voice communication between the IP telephone 12 of the client c2 and the IP telephone in of the client c3. That is, the server s1 sends PBX 4 a command to make the softphone terminal 100 participate the voice communication. When the softphone terminal 100 participates in the voice communication, the PBX 4 transmits the voice data of the conference to the client c1.

The client c1 records and stores the video data received from the client c2 and the voice data received from the PBX 4 in the storage unit 43 the respective files. When the video communication and the video conference between the client c2 and the client c3 terminates, information transmission to the client c1 is automatically terminates.

At the client c1 with both the video data and the voice data stored therein, to browse both the data, the client c1 utilizes the existing function of the client software which synchronizes and reproduces on the basis of time information included in a realtime transport protocol (RTP) packet.

As mentioned above, in the embodiment, in the conference system utilizing the IP technology, the IP terminal notifies the transmission request of the multimedia data regarding the conference before the start of the conference to the application server 3. The application server 3 associates between the IP terminal on the route included in the transmission request and the IP terminal of the request origin, and records them in the client information table. Prior to the start of video communication in the conference, the application server 3 inquires the possibility of video data relay of the conference to the IP terminal on the route. If the relay is permitted, the application server 3 transmits the video data of the conference to the IP terminal of the request origin via the IP terminal on the route. The application server 3 makes the IP terminal of the request origin participate in the voice communication of the conference by means of the PBX 4. After the participation in the voice communication, the PBX 4 transmits the voice data of the conference to the IP terminal of the request origin. The IP terminal which has received the video and the voice data of the conference records both the data in the storage unit 43 placed locally.

As the sequence for storing the multimedia data regarding the conference has performed the processing given above, the multimedia data is locally stored in the IP terminals of the clients, the system does not need to provide a dedicated server for data storage in the system. In other words, the user who dose not participate in the conference, but wants to know content of the conference, or the user who cannot participate in the conference suddenly benefits from the local recording of the multimedia data in its own terminal (telephone or PC terminal). Therefore, the user may acquire accurate information with ease and browse the information without depending on any server. Further, the user who does not participate in the conference may acquire the multimedia data without imposing trouble on actual participants. According to these given advantages, the embodiment of the invention may provide the conference system configured to readily acquire the multimedia data regarding the conference and multimedia data storage method of the system.

The present invention is not limited to the foregoing embodiments. For example, although each of the aforementioned embodiment has been described about the example which transmits the video data of the conference to the IP terminal of the request origin by setting the IP terminal as the route, even the case in which the video data is transmitted to the IP terminal of the request origin via at least either the IP terminal or the PC terminal related to the IP terminal may be embodied in a similar way.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claim and their equivalents are intended to cover such forms or modifications as world fall within the scope and spirit of the inventions.

What is claimed is:

1. A conference system which is provided with a plurality of communication terminals, a communication network which connects the plurality of communication terminals thereto and forms a communication environment among the communication terminals, and a server apparatus which actualizes a conference among users of the plurality of communication terminals by using the communication network, wherein each of the communication terminals comprises:

a notice processor which notifies an acquisition request including the fact of a request to acquire multimedia data regarding the conference and identification information of a communication terminal to be a route of the multimedia data to the server apparatus before starting the conference in which a user of a communication terminal that is a request origin may not participate and a user of the communication terminal of the route may participate; and a storage unit which stores the multimedia data to be transmitted via the communication terminal of the route, and the server apparatus comprises:

a memory unit which associates the communication terminal that is the request origin with the identification information, and stores them when the acquisition request is notified;

an inquiry processor which inquires a possibility to become the route of the multimedia data to the communication terminal of the route; and a transmission processor which transmits the multimedia data to the communication terminal of the request origin via the communication terminal of the route when a permission response is received from the communication terminal of the route in response to the inquiry.

2. The conference system according to claim 1, further comprising:

an exchange which performs call control regarding the plurality of communication terminals, wherein the transmission processor transmits voice data to the communication terminal of the request origin via the exchange when the multimedia data includes the voice data.

3. The conference system according to claim 1, further comprising:

a plurality of information processing terminals which are connected to the communication network and associated with the plurality of communication terminals, respectively, wherein the transmission processor transmits video data to at least any one of the communication terminal of the request origin and information processing terminal related to the communication terminal via at least any one of the communication terminal of the route and the information processing terminal related to the communication terminal when the multimedia data includes the video data.

4. The conference system according to claim 2, further comprising:

a plurality of information processing terminals which are connected to the communication network and associated with the plurality of communication terminals, respectively, wherein the transmission processor transmits video data to at least any one of the communication terminal of the request origin and information processing terminal related to the communication terminal via at least any one of the communication terminal of the route and the information processing terminal related to the communication terminal when the multimedia data includes the video data.

5. A multimedia data storage method to be used in a conference system which is provided with a plurality of communication terminals, a communication network which connects the plurality of communication terminals thereto and forms a communication environment among the communication terminals, and a server apparatus which actualizes a conference among users of the plurality of communication terminals by using the communication network, comprising:

notifying, by the communication terminal of the request origin, an acquisition request including the fact of a request to acquire multimedia data regarding the conference and identification information of a communication terminal to be a route of the multimedia data to the server apparatus before starting the conference in which a user of the communication terminal of the request origin may not participate and a user of the communication terminal of the route may participate;

storing the multimedia data to be transmitted via the communication terminal of the route by the communication terminal of the request origin;

associating the communication terminal of a request origin with the identification information, and storing them by the server apparatus when the acquisition request is notified;

inquiring a possibility to become the route of the multimedia data to the communication terminal of the route by the server apparatus; and transmitting the multimedia data to the communication terminal of the request origin via the communication terminal of the route by the server apparatus when a permission response is received from the communication terminal of the route in response to the inquiry.

6. The method according to claim 5, wherein when the conference system further comprises an exchange which performs call control regarding the plurality of communication terminals, further comprising:

transmitting voice data to the communication terminal of the request origin via the exchange by the server apparatus when the multimedia data includes the voice data.

7. The method according to claim 5, wherein when the conference system further comprises a plurality of information processing terminals which are connected to the communication network and associated with the plurality of communication terminals, respectively, further comprising:

transmitting the video data to at least any one of the communication terminal of the request origin or information processing terminals related to the communication terminal via at least any one of the communication terminal of the route or the information processing terminals related to the communication terminal by the server apparatus when the multimedia data includes the video data.

8. The method according to claim 6, wherein when the conference system further comprises a plurality of information processing terminals which are connected to the communication network and associated with the plurality of communication terminals, respectively, further comprising:

transmitting, by the server apparatus, the video data to at least any one of the communication terminal of the request origin or information processing terminals related to the communication terminal via at least any one of the communication terminal of the route or the information processing terminals related to the communication terminal when the multimedia data includes the video data.

* * * * *